United States Patent [19]

Hardesty

[11] 4,248,257
[45] Feb. 3, 1981

[54] FLOOD VALVE

[75] Inventor: Thomas K. C. Hardesty, Ednor, Md.

[73] Assignee: The United States of America as represented by the Secretary of the Navy, Washington, D.C.

[21] Appl. No.: 24,147

[22] Filed: Mar. 26, 1979

[51] Int. Cl.³ .................................................. F16K 17/40
[52] U.S. Cl. ............................... 137/68 A; 137/72; 137/601; 220/261; 251/DIG. 1
[58] Field of Search .................. 220/89 A, 89 B, 261; 137/68 R–77

[56] References Cited

U.S. PATENT DOCUMENTS

| | | | |
|---|---|---|---|
| 964,299 | 7/1910 | McCall | 137/72 X |
| 3,093,151 | 6/1963 | Merkowitz | 137/68 R |
| 3,109,553 | 11/1963 | Fike et al. | 220/89 A |
| 3,141,470 | 7/1964 | La Fontaine | 137/68 A |
| 3,200,706 | 8/1965 | Kinard | 89/1 B |
| 3,202,162 | 8/1965 | Eckardt et al. | 137/68 A |
| 3,254,555 | 6/1966 | Joneikis | 85/77 |
| 3,469,733 | 9/1969 | Montgomery et al. | 220/89 A |
| 3,474,809 | 10/1969 | Gordon | 137/68 A |
| 3,494,370 | 2/1970 | Wahl et al. | 137/68 A |
| 3,530,759 | 9/1970 | Francis | 85/1 |
| 3,728,934 | 4/1973 | Palmer | 89/1 B |
| 3,780,752 | 12/1973 | Noddin et al. | 137/68 A |
| 3,983,892 | 10/1976 | Hardesty | 137/68 A |

Primary Examiner—Martin P. Schwadron
Assistant Examiner—Richard Gerard
Attorney, Agent, or Firm—R. S. Sciascia; Sol Sheinbein

[57] ABSTRACT

A gas actuated valve enabling high-speed actuation silently and rapidly opens one or more blocked ports in a floodable container, thereby permitting the flooding of the otherwise closed container by ambient fluid. The valve includes a sleeve mounted for sliding movement about a base, the latter being attached to the interior of the container at each port. An electrically-initiated, gas-generating pyrotechnic bolt is threadedly connected between, and disposed in a cavity defined between the sleeve and the base. The bolt, before actuation, functions as a tensile member to withstand ambient pressure, thereby preventing the valve from opening prematurely. When actuated, the bolt fuses, separates, and releases hot gases into the cavity which expand and bear against the sleeve, causing the sleeve to move away from the port so that the container port opens completely thereby flooding the container.

33 Claims, 12 Drawing Figures

FLOOD VALVE

BACKGROUND OF THE INVENTION

The invention relates to quick-opening, remotely actuated valves and more particularly to electrically initiated flooding valves which are normally held in closed position by a pyrotechnic bolt and opened by gas pressure generated when the bolt fuses and separates.

High speed valves have found many commercial and military applications where remote and instantaneous actuation of these normally closed valves is required. One use of particular concern has involved the flooding of underwater apparatus, such as mines, where the valve is initially closed to seal the opening provided for flooding the apparatus, and at the appropriate time, opened to effect flooding thereof.

Previous systems of accomplishing high speed valve action which have used detonating chemicals for actuation are typified by U.S. Pat. No. 3,530,759 to Francis, U.S. Pat. No. 3,254,555 to Joneikis, and U.S. Pat. No. 3,200,706 to Kinard. However, the detonating chemicals in Francis represent a safety hazard, particularly during storage, and in Joneikis and Kinard, the generation of actuation noise during detonation of an explosive charge is pronounced and unavoidable. Some systems, e.g., U.S. Pat. No. 3,728,934 to Palmer, have attempted to provide an irreversibly severable linkage which is fused or destroyed by a thermite mixture thus eliminating the use of detonating chemicals. Unfortunately, Palmer does not confine the products of combustion nor does he produce a motive fluid useful for doing work.

Other known systems of accomplishing high speed valve action include (1) the use of exposed explosive charges, such as shown in U.S. Pat. No. 3,983,892 to Hardesty, U.S. Pat. No. 3,780,752 to Noddin et al, U.S. Pat. No. 3,469,733 to Montgomery et al and U.S. Pat. No. 3,109,553 to Fike et al, which create noise, heat and flame hazards when initiated, and (2) the use of a confined explosive to propel a piston or pin against a frangible shear element which are shown in U.S. Pat. No. 3,494,370 to Wahl et al, U.S. Pat. No. 3,474,809 to Gordon, U.S. Pat. No. 3,202,162 to Eckardt et al, U.S. Pat. No. 3,141,470 to LaFontaine and U.S. Pat. No. 3,093,151 to Merkowitz. While these systems provide high speed valve actuation, they do not have, in general, the capacity to minimize noise and shock. The failure to provide such an optimally silent actuating mechanism may prove extremely deleterious where the apparatus is to be subjected to detection countermeasures.

Where used with submersible apparatus, the high speed valves are usually employed as flooding mechanisms. However, those currently available have several recurring problems which are particularly troublesome. For example, those valves which provide large openings often use electrically initiated, separable, explosively actuated bolts which hold the valves closed. These bolts are undesirable since they produce loose or flying parts, generate products of combustion which contaminate the system or the atmosphere, and generally are either difficult to reload, or are simply "single-shot" devices. Other types of valves, which are quieter and non-explosive, have housings with passageways or large portions projecting below the intake port in which the valve is seated, thereby trapping air and making complete flooding of the apparatus impossible. This results undesirably in impeded water influx as well as attenuation of incoming acoustic and pressure signals. Yet another type of valve makes no provision for maintaining a smooth external contour, a feature which is highly desirable for minimizing hydrodynamic drag, especially at the forward end of propelled underwater devices.

SUMMARY OF THE INVENTION

Accordingly, the present invention provides for a gas-actuated valve located at an opening in a floodable container which includes a base member attached at the opening and a cup-shaped sleeve which is slidable about and along the base member. Opposed arcuate legs of the base member at its end nearest the opening define a hollow cylinder. A plug, connected to and carried by, one end of the sleeve, fits into and seals the container opening when the valve is unactuated, and fits into and is received interiorly of the cylinder after the valve has been actuated. When the valve is in its unactuated state, the cup-shaped sleeve and the base member form a chamber and are separably connected together by a fusible pyrotechnic bolt which is located in the chamber. Upon electrical initiation of the bolt, separation takes place between the sleeve and the base member, and the sleeve, driven away from the base member where formerly connected, slides along the base member and acts to completely remove the plug from the container opening. Noise generated during actuation is silenced not only by the use of the pyrotechnic bolt but also by proper placement of shock attenuating materials between the limit stops.

OBJECTS OF THE INVENTION

Accordingly, it is an object of the instant invention to provide a fast-acting, remotely initiated, gas driven valve.

Another object of this invention is to provide a reusable flood valve having good flow characteristics, and whose operation is optimally silent and independent of gravity or physical orientation.

Another object of this invention is to provide a flood valve which includes a fusible actuating mechanism that breaks cleanly so that loose parts and products of combustion are minimized.

Yet another object of this invention is to provide a flood valve which will enable interior confinement of any loose parts or products of combustion thereby permitting unimpeded influx of fluid.

A still further object of this invention is to provide a rapidly openable flood valve having an operating mechanism configured to permit complete flooding as well as entry of external pressure and acoustic signals.

Yet another object of this invention is to provide a flood valve which maintains the smooth contour of a submersible's outer surface so that hydrodynamic drag of the submersible, when propelled, is minimized.

BRIEF DESCRIPTION OF THE DRAWINGS

A more complete understanding of the above objects as well as the many attendant advantages of this invention will be readily appreciated as the same becomes better understood by reference to the following detailed description when considered in connection with the accompanying drawings in which like reference numerals designate like parts throughout the figures thereof and wherein.

DETAILED DESCRIPTION OF THE INVENTION

Figure 1:
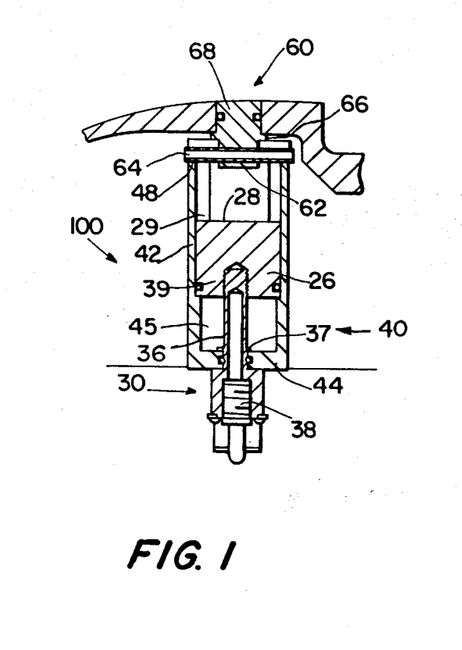
FIG. 1 shows a sectional view of the unactuated valve attached to the submersible interior at an intake port.
Figure 2:
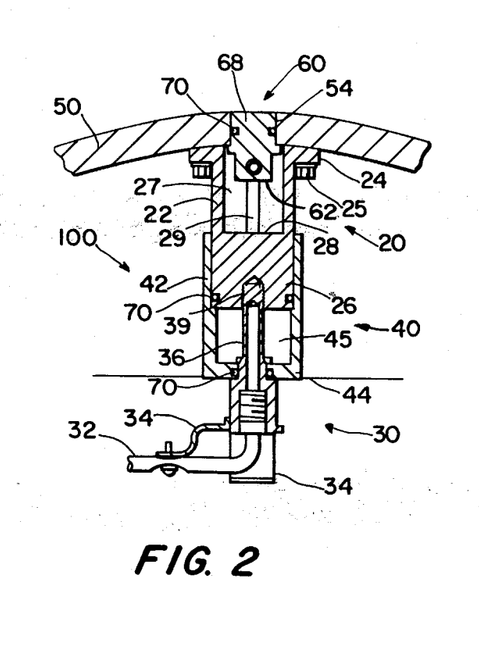
FIG. 2 shows a side view of the unactuated valve of FIG. 1.
Figure 3:
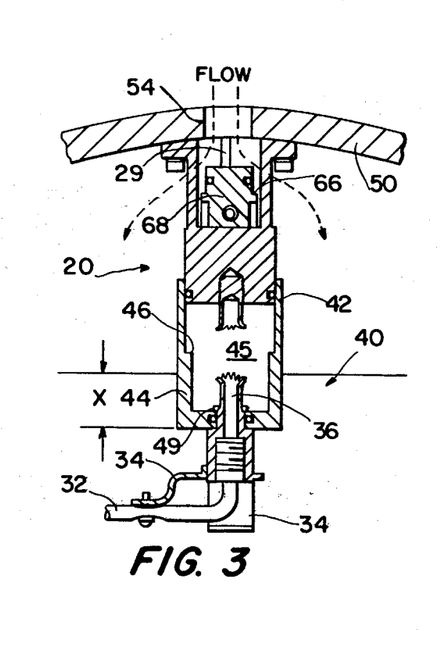
FIG. 3 illustrates the valve of FIG. 1 after actuation.

Referring now to the drawings, wherein like reference characters designate like or corresponding parts throughout the several views, FIGS. 1-3 illustrate a preferred embodiment of the invention, FIGS. 1 and 2 disclosing an unactuated valve assembly 100 attached at port 54 in wall 50 of a container, the interior of which is filled with a dry and relatively low pressure gas, e.g. atmospheric air. The exterior of the container is at a relatively high pressure, e.g. hydrostatic, and is contoured to minimize hydrodynamic drag. Port 54 is provided as a means of fluid communication between the exterior and the interior of the container.

Valve assembly 100 includes base member 20, sleeve member 40 mounted for translatory movement along, and relative to, the base member, pyrotechnic gas generating bolt assembly 30 for actuating the valve assembly, and plug assembly 60 coupled to the sleeve member for plugging, and subsequently unplugging, port 54.

Referring to FIG. 2, base member 20 includes an annular hollow upper portion 22 and an annular solid lower portion 26, the lower portion including O-ring 70 seated in a groove therearound, and the upper portion including separate, diametrically opposed, mounting flanges 24,24 for attaching the base member to container wall 50 by suitable means, as for example by fasteners 25,25. Base member upper portion 22 defines upper chamber or cavity 27 for receiving plug 68 of plug assembly 60 upon valve actuation, the cavity including limit surface 28 for limiting movement of the plug away from container wall 50 into the container. The walls of upper portion 22 include a plurality of circumferentially spaced slots 29 for cooperation with coupling pin 64 of the plug assembly as will be described below. These slots are longitudinally oriented along, and extend lengthwise of, upper portion 22.

Cylindrical sleeve member 40, shown in FIG. 1, is a slidably moveable, cup-shaped member mounted on base member 20 and includes annular, upper wall portion 42, which receives substantially all of the base member therein, and lower wall portion 44. Integral with wall portion 42 is a pair of diametrically opposed arms 48 extending upwardly from wall portion 42 toward mounting flanges 24,24, wall portion 42 terminating (FIG. 2) adjacent limit surface 28. The lower portion, which also is annular, forms the bottom of the cup-shape and defines, between itself and base member lower portion 26, lower pressure chamber 45. Shoulder 46 (FIG. 3), located interiorly of sleeve member 40 approximately midway of its length, effectively defines the junction between upper portion 42 and lower portion 44, and provides a seat against which the lower surface of base member lower portion 26 abuts when the valve assembly is in its unactuated state.

Plug assembly 60 includes plug 68, which fits snugly into port 54 when the valve assembly is unactuated. The surface of plug 68 which contacts the exterior ambient has the same arcuate configuration as that of the corresponding surrounding surface of container 50, so that the smooth outer surface of the container remains continuous when plug 68 is disposed in port 54. Plug 68 includes an annular rib which includes upper limit shoulder 66 for limiting movement of the plug into container port 54, and as O-ring 70 is seated around the plug in a suitable groove (not shown), the fit of plug 68 in port 54 is made substantially leak-proof. Plug 68 is coupled to sleeve member arms 48 by coupling pin 64 which extends diametrically across the sleeve member upper portion and through slots 29. Coupling pin 64 also has its ends seated and held in openings (located in the uppermost region of sleeve arms 48) by suitable retaining means, such as friction fit washers or lock nuts (not shown) which circumferentially grip the pin outside, and adjacent to, sleeve member arms 48. Movement of plug 68 away from port 54 is limited by lower face 62 of plug 68 abutting against limit surface 28 of base member 20.

Disposed within pressure chamber 45 is bolt 36, which is both a gas generator and a pyrotechnic fastener device. The bolt is separable, i.e. it can be fused or melted to cause separation of the structural elements to which it is connected at its opposing ends, and is preferably of the kind disclosed in related U.S. application Ser. No. 826,509, now U.S. Pat. No. 4,158,322, (incorporated by reference into the instant application), and Ser. No. 7,852, filed by Thomas K. C. Hardesty on Jan. 30, 1977, a division of U.S. Pat. No. 4,158,322. As set forth in that application, the bolt is preferably a tensile tubular element of non-uniform cross-section which contains a quantity of a pyrotechnic mixture within a chamber in a hollow central portion of the bolt. The pyrotechnic mixture is preferably of the type described in any one of U.S. Pat. Nos. 3,695,951, 3,503,814 and 3,890,174 all issued to Helms, and upon ignition will generate a great deal of heat and gas capable of doing work, i.e. motive fluid. An ignition subassembly 38 seals off chamber 45 and is connected to firing cable 32. Firing cable 32 is securely attached and positioned relative to bolt 36 by mounting clamp 34, which communicates with a source of electrical energy (not shown), thereby permitting initiation of the ignition of such mixture from a remote location. Actuation of the pyrotechnic bolt assembly causes sufficient electrical energy to be supplied to the ignition subassembly to ignite the pyrotechnic mixture.

In the present invention, pyrotechnic bolt 36 is also employed as a tensile link to fasten sleeve member 40 to base member 20 prior to actuation so that the lowermost surface of base member lower portion 26 is firmly seated on sleeve member shoulder 46, and plug 68 fits snugly into port 54. The pyrotechnic bolt is designed to have a tensile strength sufficient to withstand the external i.e., ambient pressure. Opening 49 is provided in the lowermost end of sleeve member lower portion 44 concentric with sleeve member 40. Concentric with opening 49 and located in the base member lower portion 26 is threaded opening 39. Bolt 36 is inserted through opening 49, secured to the sleeve member with lock nut 37, and then threadedly engaged with opening 39 so that the bolt is disposed concentrically with respect to base member 20 and sleeve member 40. Another O-ring (at 70) is seated in a groove cut around the base of the tubular spindle portion of bolt 36 thereby sealing the bolt in sleeve member lower portion 44. This also insures that prior to actuation, pressure chamber 45 will be contamination free, and that after actuation all products of combustion will be contained wholly within pressure chamber 45.

Operation of the FIGS. 1 and 2 valve assembly contemplates the generation, at some remote location, of an electric signal or impulse to initiate ignition of the pyrotechnic mixture in the ignition subassembly of bolt 36. As shown in FIG. 3, the burning mixture melts a thin fusible wall in the bolt causing the bolt head to be separated from the remainder of the bolt 36. When this occurs, high pressure gases generated during combustion of the pyrotechnic mixture are released into pressure chamber 45, and being confined therein in a predetermined initial volume, force sleeve member 40, heretofore secured to base member 20 by the bolt, to translate away, i.e. downward into the container, from the base member some distance "X" from its initial or unactuated position, as shown in FIG. 3. This translatory movement of the sleeve member also causes plug 68 to be rapidly pulled and removed from port 54. The rapidity of the downward motion ["X"] of sleeve member 40 is predetermined by choosing an appropriate amount and/or strength of pyrotechnic mixture to be used in bolt 36. Preferably, however, the plug should be completely removed from port 54 thereby leaving a completely unobstructed entrance way for the exterior incoming fluid. Once open, the valve is held in the position shown in FIG. 3 by internal gas pressure in chamber 45, by the pressure developed by the incoming fluid, or by other means, e.g. a spring loaded mechanical latch to be described in connection with FIG. 4. Products of combustion are contained within pressure chamber 45 by the sealing O-rings 70 located between sleeve member 40 and base member 20 as well as between sleeve member 40 and bolt 36.

Figure 4:
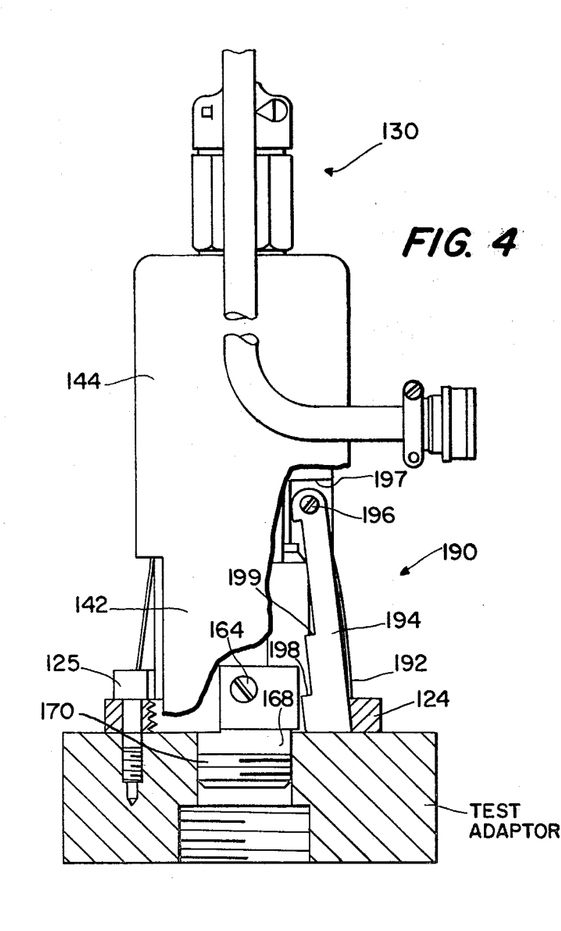
FIG. 4 shows a second embodiment of the valve of this invention in its unactuated state.

FIG. 4 depicts a similar valve assembly with the addition of latch mechanism 190 provided for locking plug 168 in its retracted position so that the port at which the valve assembly is mounted remains completely unobstructed and permits maximum flooding. Moreover, latch mechanism 190 prevents plug 168 from re-entering the port after the container has been flooded as a result of the pressure acting on the sleeve member caused by the incoming fluid. Latch arm 194 is pivotally attached to the valve assembly at pivot pin 196, the latter being located in recess 197. Latch spring 192, attached to limit surface 128 of base member 120, bears against the outer surface of latch arm 194 pushing the arm inwardly toward plug 168. Thus upon actuation of the valve assembly, sleeve member 144 and plug 168 retract and the plug is then maintained in that position by the interaction of a plug outer shoulder with shoulder 199 of latch arm 194. Of course, where the rapid rate of influx of the ambient or outside fluid is not so critical, the pyrotechnic mixture in the bolt may be chosen so that plug 168 opens the port only partially, as for example where the incoming fluid is under pressure and introduced through a pressure line connected at the port of the test adaptor. In such a case, only shoulder 198 of latch arm 194 need be employed to keep plug 168 retracted.

While the latch mechanism actually includes a pair of identical, opposed subassemblies, for purposes of simplicity only one has been described above. The valve assembly in FIG. 4 is shown attached to a test adaptor which includes a pressure connector at the port so that for test purposes sea pressure may be simulated. It is understood however that the valve assembly with latch is designed for use anywhere and at any type of port, e.g. in a submersible or other closed, yet floodable container. Moreover, the means for creating an inwardly directed force acting on latch arm 194 need not be limited to spring 192. For example, other possibilities include a coil spring encircling both latch subassemblies, a spring mounted about and along pivot 196, or arm 194 itself having inherent spring characteristics, e.g. made of a resilient, high-strength material.

Figure 5:
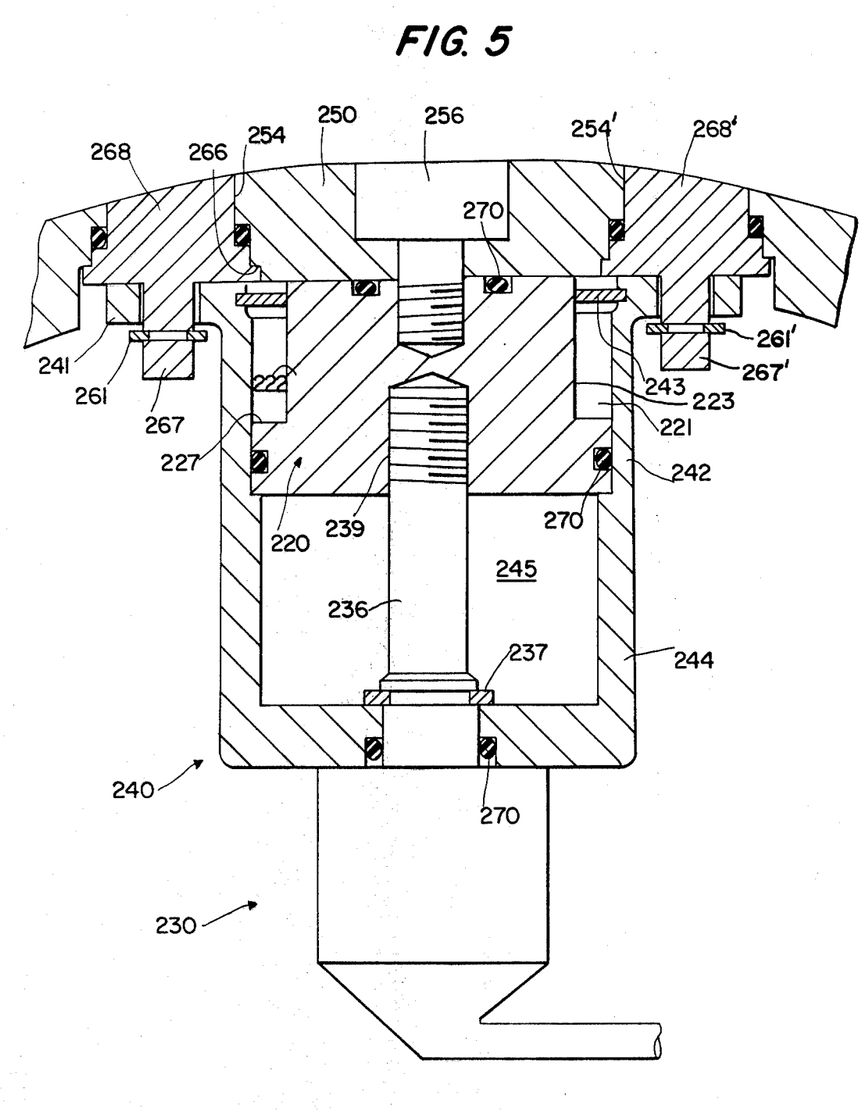
FIG. 5 shows a third embodiment of the valve of this invention shown partly in section.

FIG. 5 depicts a modification of the flood valve disclosed in FIGS. 1–3, where identical plugs 268 and 268' are provided to increase the flood rate, the increase in rate being directly proportional to the number of valves employed, e.g., two plugs doubling the flood rate, three plugs tripling the flood rate, etc. Pyrotechnic gas generating bolt assembly 230 including pyrotechnic bolt 236 is provided to secure sleeve member 240 to base member 220 and to ensure that plugs 268, 268' fit securely and sealingly in intake ports 254, 254'. Container wall 250 also supports and carries fastener 256 for attaching base member 220 to the container wall. Each of plugs 268, 268' include respective stem portions 267, 267', and retention rings 261, 261' are disposed in a groove about the stem portions of the plugs so that each of the plugs are retained in sleeve member annular flange 241 and, by virtue of their being coupled to the sleeve member, after valve actuation translate inwardly in direct response to inward translation of the sleeve member. An O-ring 270 is disposed about each plug 268, 268', as well as between base member upper portion 222 and container wall 250, between the base member and the sleeve member, and between the sleeve member and the lowest part of the shank of the pyrotechnic bolt 236. Annular retaining ring 243 is secured to sleeve member flange 241 and is disposed about the upper portion of base member 220. The radially innermost edge of ring 243 abuts and slides along wall 223, the latter defining a longitudinally extending annular guide recess 221 disposed about the upper portion of base member 220. The lower end of guide recess 221 defines a limit surface 227 which limits the translational movement of sleeve member 240 and plugs 268, 268' inwardly from the container surface after the bolt 236 is actuated.

Upon actuation of the FIG. 5 valve assembly, i.e., after fusion and separation of bolt 236, sleeve member 240 is rapidly driven away from container wall 250. Plugs 268 and 268' are also driven away from the container wall 250 and consequently out of intake ports 254 and 254', respectively, as a result of their connection to sleeve annular flange 241. When sleeve member 240 begins to translate inwardly from container wall 250, flange 241 bears against retention rings 261, 261' thereby imparting a similar translatory motion to plugs 268, 268'.

Sleeve member 240 is constrained to movement along base member 220 as a consequence of retaining ring 243 surrounding, abutting, and sliding along, wall 223 of annular guide recess 221. Movement of sleeve member 240 into the container is additionally limited by the abutment of ring 243 against limit surface 227 at the lower end of guide recess 221 the distance between the location of ring 243 before the valve is actuated and the location of limit surface 227 being designed to provide sufficient travel of plugs 268, 268' out of ports 254, 254' so that the ports become completely unobstructed.

Figure 6:
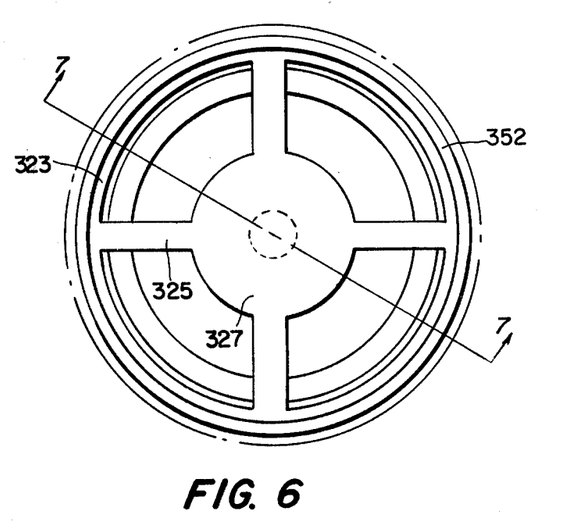
FIG. 6 is a top plan view of a fourth embodiment of the valve of this invention.
Figure 7:
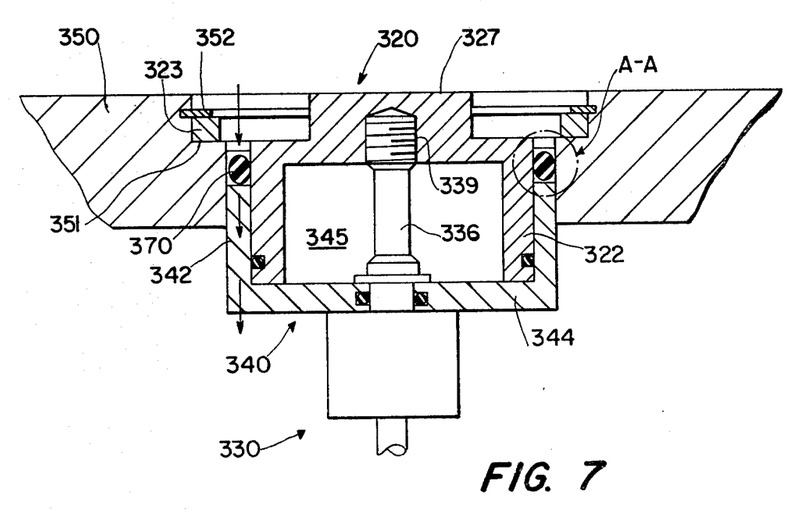
FIG. 7 is a view of the embodiment of FIG. 6, shown partly in section, and taken along the section line 7—7.

FIGS. 6 and 7 illustrate a fourth embodiment of the invention, which finds utility where retention of parts, after separation of the pyrotechnic bolt, is not required. FIG. 6 depicts a top view of the valve assembly shown in FIG. 7, the latter being a sectional view taken along line 7—7 of FIG. 6.

Referring now to FIG. 7, the valve assembly requires only pyrotechnic bolt assembly 330 (of the kind disclosed in Ser. No. 826,509 referred to above), base member 320 and sleeve member 340. Base member 320 is disposed concentrically within an opening in cylinder wall 350, and is secured therein by annular member 323, seated on shoulder 351 of container wall 350. The annular member is attached to the body by a plurality of arms 325 (FIG. 6) extending radially outwardly from the body portion, the arms, the body portion and the annular member preferably being unitary. Locking annular member 323 within the container wall opening is resilient retaining ring 352 which is secured within an annular groove in the port disposed in proximity to the outer surface of container wall 350. When the body portion is locked in place in the container wall opening, an annular port is defined between member 320 and the wall of the opening in container wall 350. This annular port defines the passageway which admits the ambient fluid into the container interior thereby flooding it. Base member 320 also includes annular flange 322 which extends away from annular member 323 into the interior of the container thereby forming an inverted cup. Sleeve member 340 is cup-shaped and includes lower portion 344 with annular flange 342 extending outwardly through the port and toward the container outer surface. Bolt 336 of the pyrotechnic bolt assembly, inserted through sleeve member lower portion 344 and threadedly engaged in threaded opening 339 in body 327 of base member 320, is employed to fasten sleeve member lower portion 344 to the body of base member 320.

When assembled, the sleeve member 340 receives annular flange 322 of the base member thereby defining closed and sealed chamber 345 in which bolt 336 is disposed. Resilient O-ring 370, disposed in the annular port just above the uppermost end of annular flange 342, operates to seal the container interior from the ambient. The uppermost surface of annular flange 342 is formed with a concave surface and disposed above O-ring 370 is a retention mechanism described below in conjunction with FIGS. 8 and 9. These latter Figures depict the region A—A of FIG. 7 in enlarged views, the two representing two variations used with the invention of FIG. 7.

Figures 8, 9, 11:
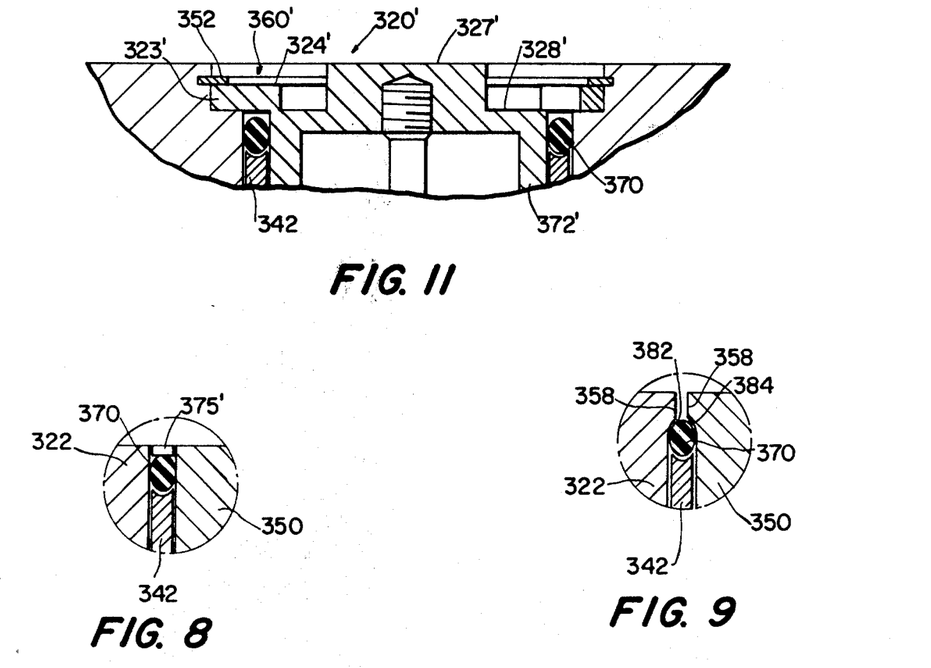
FIG. 8 is an enlarged view of the region marked A—A located in FIG. 7, showing an O-ring retention structure.
FIG. 9 is a modification of the O-ring retention structure depicted in FIG. 8.
FIG. 11 is a view of the embodiment of FIG. 10, shown partly in section, and taken along section line 11—11.

FIG. 8 shows resilient ring 375' placed in the annular port defined between base annular wall 322 and container wall 350. The resilient ring 375' is located above, i.e. outwardly of, O-ring 370 and sleeve annular flange 342, and serves to prevent the O-ring from becoming dislodged from its sealing position in the port above sleeve flange 342 as a result of a reverse pressure differential between the container internal pressure and the ambient pressure.

Alternatively, as shown in FIG. 9, the O-ring may be retained in the annular port by forming the facing surfaces of either one, or both, of base annular wall 322 and container wall 350 with necked-down portion 358, thus resulting in the annular port being narrower than the smallest thickness of O-ring 370. Base annular wall 322 defines arcuate stop 382, and container wall 350 defines arcuate stop 384, the two stops together cooperating, along with the outer surface of sleeve annular flange 342, to define a chamber for O-ring 370, the O-ring being captured in the chamber and prevented from being dislodged either toward, or away from, the interior of the container.

Upon actuation of the FIG. 6 valve assembly, bolt 336 fuses, releasing hot gases as it separates. The gases generate a high pressure which bears against all internal surfaces of chamber 345, and together with the ever-present ambient pressure, rapidly drives the cup-shaped sleeve member 340 downwardly out of the port in container wall 350 and into the container interior. As the uppermost end of sleeve annular flange 342 is pulled from the port, a negative force or suction is created under O-ring 370, and as a result of the presence of either resilient ring 375 (FIG. 8) or stops 383, 384 (FIG. 9), the O-ring is pulled downward and out of the port, substantially simultaneously with the annular flange 342. In the FIG. 9 O-ring retention assembly, this leaves the port unobstructed about base member 320. The same is true of the FIG. 8 assembly, after ring 375 is driven through the port by, and in the direction of, the in-rushing fluid.

Figure 10:
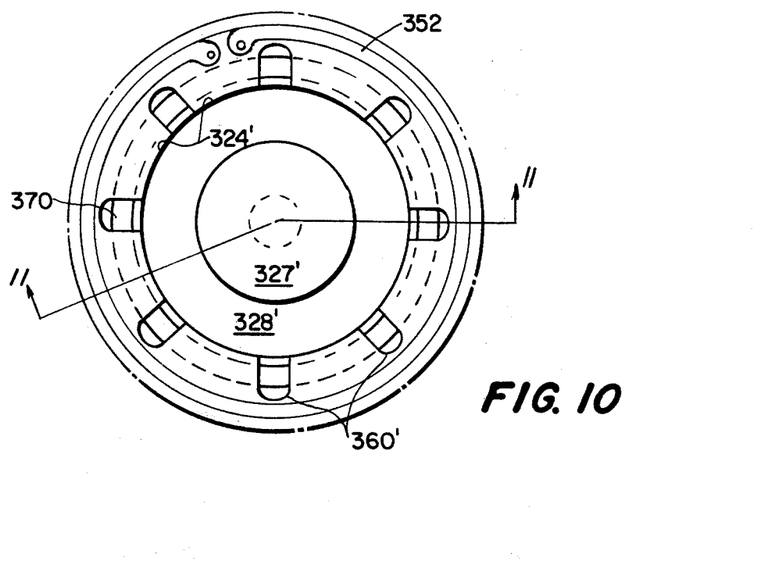
FIG. 10 is a top plan view of a fifth embodiment of the valve assembly.

FIGS. 10 and 11 depict a variation of the assembly of FIGS. 6 and 7, in which annular member 323' and body 327' of base member 320' are formed as an integral, unitary member. Connecting portion 324' joins the annular member and the body (FIG. 11) on opposing sides of each of the radially extending slots 360 so that annular well bottom 328' separating the annular member from the body. In a manner similar to that shown in FIGS. 6 and 7, base member 320' is maintained in the annular port by means of resilient retaining ring 352 which snaps into place in a preformed annular groove and overlies a radially outermost portion of annular member 323'. With this construction O-ring 370 is inserted in the port above base annular wall 322' and when sleeve annular portion is fitted in place and the bolt tightly engaged with base member 320', the uppermost concave surface of the sleeve annular portion and the lowermost surface of annular member 323' tightly trap O-ring 370 therebetween to thereby create a temporary, yet secure, seal.

Provision may be made for retention of the sleeve member 340 of the valve assembly shown in either FIGS. 6–9 or 10–11, and would be accomplished by providing a suitable bracket between the sleeve member 340 and either the container wall 350 or the base member 320.

Figure 12:
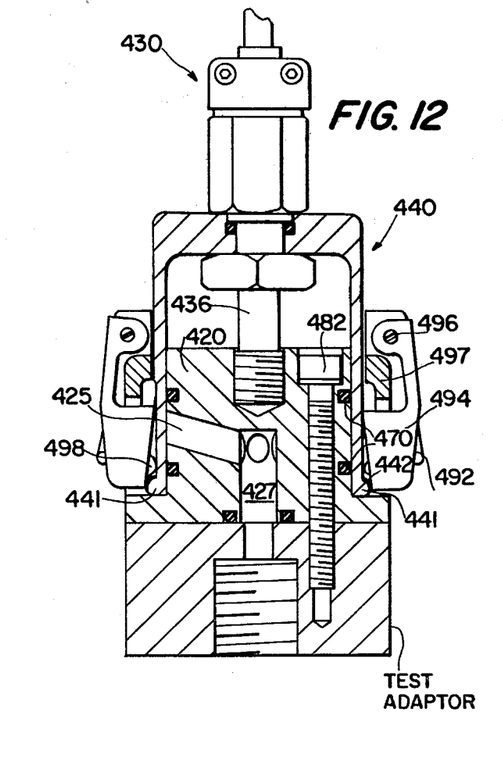
FIG. 12 illustrates a sixth embodiment of the valve assembly.

FIG. 12 discloses another embodiment of the valve assembly which includes sleeve assembly 440, base member 420 and pyrotechnic bolt assembly 430. The valve assembly is shown mounted on a test adaptor, for purposes of experimentation (but is intended for use with the intake port of a floodable container( by 3 fasteners 482 spaced equally about bolt 436. Base member 420 includes three intake channels 425 equally spaced about central channel 427, the intake channels extending from the central channel radially outwardly and in a direction away from the test adaptor (container wall). Disposed circumferentially about base member 420 are two O-rings 470, 470, the O-rings located above and below intake channels 425. Sleeve assembly 440 includes a cup-shaped metallic housing surrounding bolt 436 and having bulbous lip 441 on the end of the sleeve annular flange, the lip including a coating of rubber or a rubber sleeve therearound, for purposes to be later explained. When the bolt 436 has been fastened in place prior to valve actuation, intake channels 425 are sealed against leaks by the sleeve flange and the O-rings 470 are disposed proximally above and below the intake channels. Attached to base member 420 is a latch assembly for maintaining annular lip 441 of the sleeve assembly in such a position as to leave the intake channels unobstructed after valve actuation. The latch assembly includes annular latch body 497 which supports latch arms 494. The arms are pinned to the body for rotation about the pin axis, are biased against the sleeve annular flange by spring 492, and include a nib 498 which prior to valve actuation lies adjacent to lip 441 on the sleeve annular flange.

When the valve is actuated, i.e. when the bolt 436 fuses and separates, rapidly driving sleeve assembly 440 away from base member 420 (as described in connection with the embodiment of FIGS. 1-3), lip 441 cams nib 498 away from the sleeve annular flange to permit the lip to clear intake channel 425. When the lip slams into latch body 497, it no longer bears against arm 494, and the latch arm, under action of spring 492, pivots back toward its intial position and in so doing captures lip 441 between itself and body 497, thereby locking the sleeve assembly in a open position to leave intake channels 425 completely unobstructed. As a result of the lip having the aforementioned rubber coating or rubber sleeve, when the lip collides with the latch body any noise which might otherwise have been generated is practically eliminated so that the valve assembly of FIG. 12 is silent in its operation.

There has therefore been described a silent flood valve mechanism for flooding the interior of a container on electrical command. The valve, located at a container intake port, utilizes motive fluid generated by a fusible pyrotechnic bolt to remove a plug from the port and thereby enable complete and unobstructed flooding of the container by the incoming ambient fluid. The valve provides assurance of the continuity of the container surface contour prior to actuation so that hydrodynamic drag of the container, when propelled, is minimized. The valve also assures a clean and unobstructed intake port to maximize influx of the ambient fluid, as well as subsequent entry of pressure and acoustic signals. An important advantage of the present invention is that it uses no high explosive materials and produces no loose parts, the products of fusion of the bolt being confined in the cavity between the sleeve and the base member. Another significant advantage is that the valve assembly can be easily disassembled, cleaned and reloaded with another pyrotechnic bolt.

Obviously many modifications and variations of the present invention are possible in the light of the above teachings. It is therefore to be understood that, within the scope of the appended claims, the invention may be practiced otherwise than as specifically described.

What is claimed is:

1. A pyrotechnically actuated valve fitted within an enclosed wall means, said wall means having at least one opening therethrough communicating the interior of said wall means with high pressure ambient fluid, comprising:

a base member attached to said wall means at said at least one opening, means for translating along said base member, said translating means disposed concentrically about said base member and comprising means for blocking each of said at least one opening such that movement of said translating means away from said at least one opening causes said blocking means to unblock said at least one opening, means defining a pressure cavity between said base member and said translating means, means for separably fastening said base member and said translating means, said fastening means being disposed within said cavity and being fixed at one end to said base member and at its other end to said translating means, said fastening means being fusible and including a pyrotechnic mixture capable of producing a high pressure motive fluid upon fusion, and means for initiating fusion of said fastening means, whereby prior to valve actuation said blocking means is positioned within said opening and upon valve actuation, said fastening means fuses and separates allowing release of high pressure motive fluid within said cavity thereby forcing said translating means to move away from said base member and removing said blocking means from within said opening.

2. The valve as set forth in claim 1 wherein:

said translating means is a hollow cup which includes an annular first portion and an annular second portion, the internal diameter of said second portion being smaller than the internal diameter of said first portion, and said base member includes a cup-shaped portion having an annular portion extending longitudinally therefrom and terminating in a flange portion, said base member being attached to said wall means at said flange portion.

3. The valve of claim 2 wherein said flanged portion is disposed at said opening in said wall means.

4. The valve of claim 2 wherein said flange portion is disposed within said opening in said wall means.

5. The valve as set forth in claim 2 wherein said flange portion of said base member includes apertures therethrough and said base member is attached to said wall means by threaded fasteners which extend through said apertures in said flange portion.

6. The valve as set forth in claim 1 wherein:

said translating means includes first and second annular wall portions defining therebetween means for limiting insertion of said base member into said translating means.

7. The valve as set forth in claim 6 wherein:

said base member and said translating means second portion define therebetween said pressure cavity, and said limiting means defines an annular seat against which the lower portion of said base member abuts.

8. The valve as set forth in claim 1 wherein said base member includes an annular flange portion, said translating means defines an annular cup, and said fastening means is secured concentrically within said cup.

9. The valve as set forth in claim 8 wherein said base member flange portion is attached at said wall opening.

10. The valve as set forth in claim 8 wherein said base member defines a cup.

11. The valve as set forth in claim 10 wherein said cup is inverted.

12. The valve as set forth in claim 1 wherein said translating means includes an annular flange.

13. The valve as set forth in claim 12 wherein said wall means includes a plurality of openings and one blocking means for each said opening is provided, said blocking means being attached to said flange such that upon valve actuation, movement of said translating means away from said openings causes said openings to become simultaneously unblocked.

14. The valve as set forth in claim 1 wherein said blocking means comprise at least one means for sealing said at least one opening.

15. The valve as set forth in claim 14 wherein:
said translating means includes an annular radially extending flange disposed adjacent said wall means,
each of said sealing means including a portion thereof disposed in its respective opening, each of said sealing means further being attached to said flange.

16. A valve as set forth in claim 1 wherein said wall means includes a single opening and said blocking means comprises a plug element including a first portion sealingly disposed in said opening and a second portion coupled to said translating means.

17. A valve as set forth in claim 16 wherein said second portion further includes an aperture extending therethrough and a coupling pin disposed in said aperture, said coupling pin being attached, at its opposite ends, to said translating means, and
said first portion includes a groove extending circumferentially thereabout and a sealing element disposed in said groove,
whereby when said blocking means is disposed in said opening, said sealing element prevents leakage of said high pressure ambient fluid into said wall means.

18. A valve as set forth in claim 1 wherein said blocking means comprises means for sealing said at least one opening, and
said translating means is configured to coact with said blocking means.

19. A valve as set forth in claim 18 wherein said blocking means includes a coupling pin disposed therethrough said pin being coupled to said translating means.

20. A valve as set forth in claim 18 wherein said base member includes a body portion and means for attaching said body portion to said wall means, the external diameter of said attaching means being greater than the largest diameter of said body portion;
said valve further comprising means associated therewith for securing said base member to said wall means, and
said translating means being mounted on said body portion for sliding movement therealong toward and away from said at least one opening.

21. A valve as set forth in claim 20 wherein said attaching means of said base member is disposed within said opening, said securing means comprises a resilient annular fastener seated in a circumferential groove in said opening, and bearing against said attaching means to thereby lock said base member within said opening, said attaching means overlying a portion of said blocking means.

22. A valve as set forth in claim 21 wherein said attaching means and said body portion and unitary.

23. A valve as set forth in claim 21 wherein:
said base member is disposed concentrically within said opening such that an annular space is defined between said opening inner diameter and said body portion external diameter,
said blocking means is annular and disposed within said annular space, and
said translating means includes an annular flange portion, the free end of which is complementarily configured to coact with said blocking means and is disposed in said annular space adjacent said blocking means, such that when said translating means is moved away from said opening toward the interior of said enclosed wall means, negative pressure is created adjacent said blocking means thereby sucking said blocking means out of said annular space toward the interior of said enclosed wall means.

24. A valve as set forth in claim 23 wherein:
barrier means is disposed adjacent said blocking means in said annular space such that said blocking means is sandwiched between said barrier means and said annular flange portion free end.

25. A valve as set forth in claim 24 wherein said barrier means is removable from said annular space.

26. A valve as set forth in claim 24 wherein said barrier means comprises facing complementary surfaces unitary, respectively, with said wall means and said base member body portion, to thereby provide another annular space between said opening inner diameter and said body portion external diameter, said other annular space being located on the ambient side of said blocking means, and being smaller than the cross-section of said blocking means.

27. A valve as set forth in claim 20 wherein said attaching means and said body portion and unitary.

28. A valve as set forth in claim 20 wherein:
said body portion includes diametrically opposed slots extending along the length thereof,
said blocking means includes a coupling pin disposed therethrough and coupled to said translating means, and
said coupling pin is confined to movement within said slots such that said blocking means, when removed from said opening in said wall means, is effectively constrained for movement along said base member body portion.

29. A valve as set forth in claim 1 further including a latching assembly attached to said base member comprising means for holding said blocking means in at least a first position thereby said blocking means is completely removed from said opening, and said opening is completely unobstructed.

30. A valve as set forth in claim 29 wherein said latching assembly includes at least a pair of opposed latching arms pivotally mounted on said base member, and means associated with each said arm for biasing said arm toward said blocking means.

31. A valve as set forth in claim 30 wherein each of said arms includes at least one shoulder thereon, said shoulders on said arms being disposed opposite each other, and coacting with said blocking means to capture a corresponding coacting shoulder on said blocking means therebetween, and thereby hold said blocking means completely free of said opening.

32. A valve as set forth in claim 31 wherein each of said arms include at least another shoulder thereon, said another shoulder provided for holding the blocking means in a partially unblocking position.

33. A valve as set forth in claim 31 wherein said blocking means includes a flange, said flange coacting with said latching arm shoulders to hold said blocking means in an open position, each of said arms including a cam nib thereon for coaction with said blocking means flange, so that when said valve is actuated, said blocking means flange coacts with said cam nibs on said latching arms thereby causing them to pivot about their pivotal mountings and release said blocking means for movement out of said wall means opening and past said arms, whereby when said blocking means flange passes behind said shoulder on said latching arm both said latching arms pivot back to their original position and capture said blocking means therebetween and behind said latching arm shoulders, thereby leaving said opening in said wall means completely unobstructed.

* * * * *